US005373413A

United States Patent [19]

Shannon et al.

[11] Patent Number: 5,373,413

[45] Date of Patent: Dec. 13, 1994

[54] SURGE ARRESTER HAVING SOLID STATE SWITCH

[75] Inventors: William J. Shannon, Saco; Mark P. Cote, Springvale, both of Me.

[73] Assignee: Siecor Puerto Rico, Inc., Hickory, N.C.

[21] Appl. No.: 594,490

[22] Filed: Oct. 5, 1990

[51] Int. Cl.[5] ............ H02H 9/06

[52] U.S. Cl. ............ 361/119; 361/124

[58] Field of Search ............ 361/117, 119, 124; 337/31, 32

[56] References Cited

U.S. PATENT DOCUMENTS

| | | | |
|---|---|---|---|
| 4,128,855 | 12/1978 | Gilberts | 361/119 |
| 4,208,694 | 6/1980 | Gilberts | 361/119 |
| 4,241,374 | 12/1980 | Gilberts | 361/124 |
| 4,340,923 | 7/1982 | Bazarian et al. | 361/120 |
| 4,493,003 | 1/1985 | Mickelson et al. | 361/119 |
| 4,851,956 | 7/1989 | Borkowicz et al. | 361/118 |
| 4,903,295 | 2/1990 | Shannon et al. | 379/437 |
| 4,958,254 | 9/1990 | Kidd et al. | 361/119 |

*Primary Examiner*—Steven L. Stephan
*Assistant Examiner*—Adolf Berhane
*Attorney, Agent, or Firm*—J. David Abernethy

[57] ABSTRACT

A surge arrester for telephone lines comprises a threaded metal enclosure for insertion into a threaded well of a station protector. The protective element within the threaded metal enclosure is a voltage sensitive solid state switch comprising a semiconductor chip sandwiched between two flat electrodes. One electrode is in contact with a metal plate which is in contact with a solder disc. The other electrode is in contact with a metal post disposed in, and extending through, a plastic spacer within the threaded metal enclosure.

6 Claims, 4 Drawing Sheets

SURGE ARRESTER HAVING SOLID STATE SWITCH

This invention concerns surge arresters for telephone lines and particularly surge arresters contained within threaded metal enclosures for insertion into threaded wells of station protectors. Such station protectors are shown in U.S. Pat. Nos. 4,757,880, 4,655,360, 4,584,624, 4,506,310, 4,447,848, 4,551,015, 4,540,923, 4,241,374, 4,208,694, 4,158,869, 4,132,915, 4,128,855, 4,002,952, 3,993,953 and 3,310,712. In the past, the surge arresters in such station protectors were arc gap devices, either carbon blocks or gas tubes. This invention discloses an improved surge arrester.

A surge arrester in accordance with this invention comprises a bidirectional voltage sensitive switch (BVSS) in the form of a semiconductor chip sandwiched between two flat electrodes. One of the electrodes is in contact with a metal plate which is in contact with a solder disc. The other electrode is in contact with a metal post which is contained in a floating arrangement within a plastic spacer. The BVSS, plate, solder disc, post and spacer are contained within a threaded metal enclosure of the type mentioned above. One of the electrodes is electrically connected to a tip or ring terminal of a station protector and the other electrode is connected to a ground of the station protector. In operation, a surge voltage in excess of the breakdown voltage of the BVSS will be shunted from the terminal to ground through the BVSS.

In one embodiment, the BVSS, plate, solder disc, post and spacer are contained within a shorting cage of the type normally used in the above-mentioned threaded metal enclosures.

In the drawing,

FIG. 1 is a sectional view and

FIG. 2 a perspective of a threaded metal enclosure containing a surge arrester as per this invention.

Figure 1:
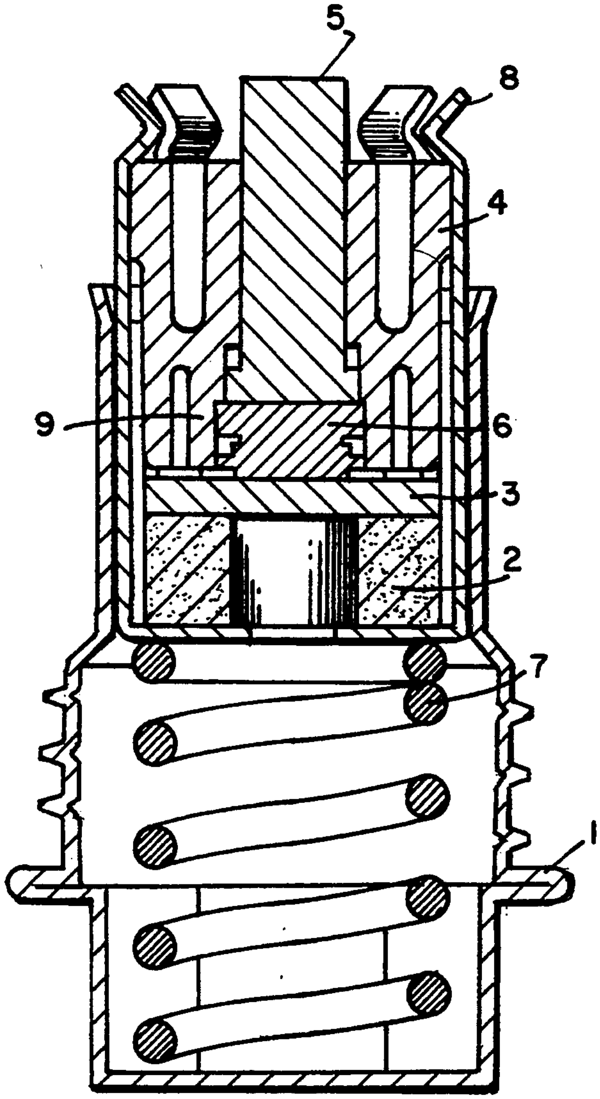
Figure 2:
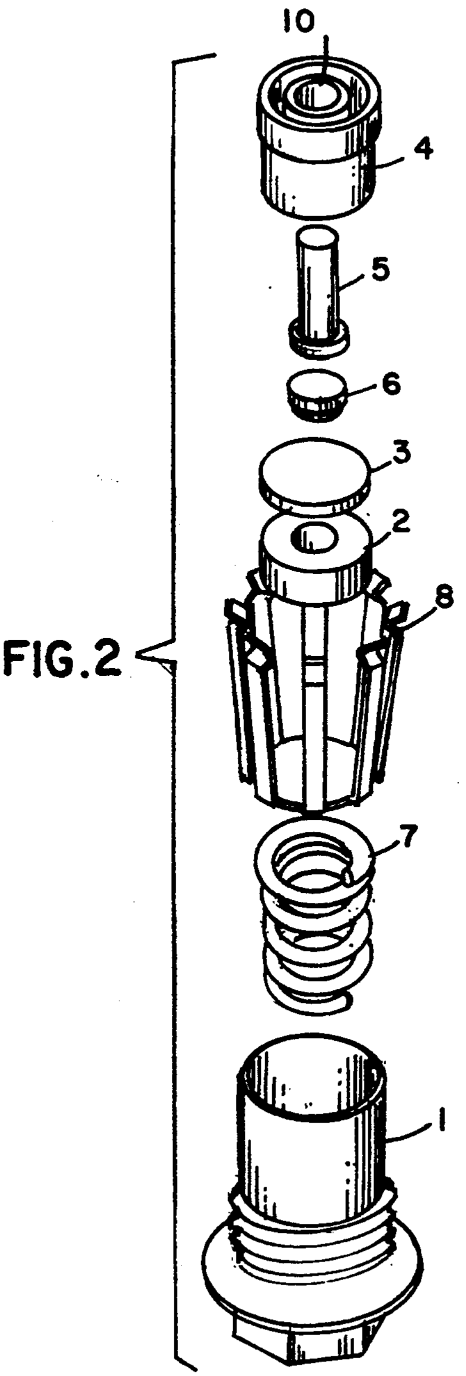
Figure 3:
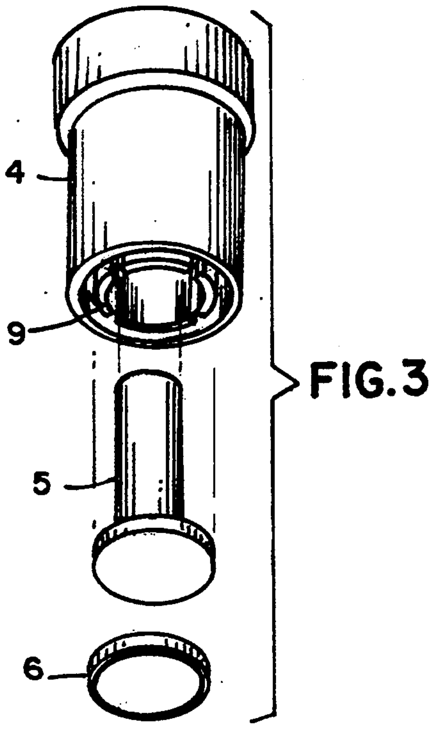
FIG. 3 shows the spacer, post and BVSS.

Threaded metal enclosure 1 is of the type normally used, either ½-20 or 7/16-20, in threaded wells of station protectors. Disposed against the closed end of enclosure 1 is a spring 7 the purpose of which is to permanently ground the telephone terminal that enclosure 1 is connected to when fusible element 2 melts. Disposed within enclosure 1 is metal cage 8 against which spring 7 pushes. Disposed within the closed end of cage 8 is fusible element 2 which, in this embodiment, is a disc made of soft solder. Metal plate 3 is sandwiched between fusible element 2 and BVSS 6. One electrode of BVSS 6 is in contact with plate 3 and the other electrode is in contact with the head of metal post 5. Metal post 5 is positioned within plastic spacer 4 which, in turn, is positioned within cage 8. Hole 10 in spacer 4 through which post 5 extends is slightly larger than the diameter of post 5 so that post 5 can float freely therewithin. The reason for this is to reduce the friction force necessary to press BVSS 6 into the subassembly in order to avoid cracking the semiconductor chip. BVSS 6 fits within circular enclosure 9 of spacer 4, slotted for resiliency and to hold BVSS 6 during assembly.

The purpose of metal plate 3 is to prevent BVSS 6 from sinking into soft solder element 2. Plate 3 spreads out the compression force present at final installation over the entire surface of element 2, reducing the likelihood of solder cold flow, which can occur at high levels of force per unit area. Plate 3 also helps the operation of the failsafe mechanism by conducting heat, which is generated in BVSS 6 during sustained high current AC surges, to solder element 2. This shortens the melting time of the solder, thereby reducing the maximum temperature generated in the arrester. Preferably, plate 4 is made of brass or copper. When solder element 2 melts, spring 7 pushes cage 8 into permanent contact with a ground in the station protector, as is known in the art, necessitating replacement of the enclosed assembly.

Examples of BVSS 6 that may be used with this invention are the P30SOQB Sidactor made by Teccor Electronics, Inc., the JSTPB205B Trisil made by SGS-Thomson Microelectronics, Inc. or the PT8 voltage suppressor made by Semitron Industries Ltd. In one example, BVSS 6 was 156 mils diameter by 80 mils thick and had a breakdown voltage of 270 volts.

Figure 4:
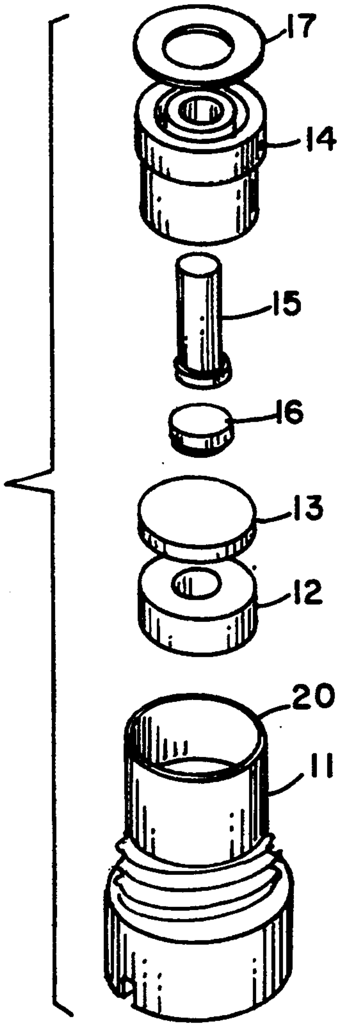
FIGS. 4 and 5 show another embodiment of the invention.
Figure 5:
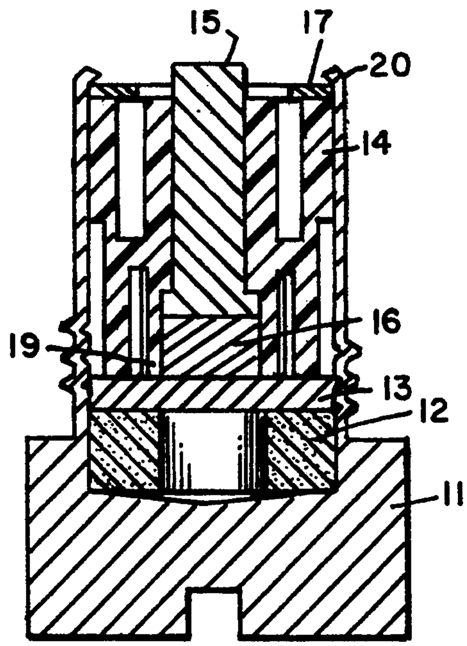

FIGS. 4 and 5 show another embodiment without the cage. Disposed within threaded metal enclosure 11 are solder disc 12, metal plate 13, BVSS 16, metal post 15, plastic spacer 14 and metal washer 17. Solder disc 14 rests on the closed end of enclosure 11 and metal plate 13 rests on solder disc 12. BVSS 16 is contained within slotted enclosure 19 of plastic spacer 14. One electrode of BVSS 16 is in contact with metal plate 13 and the other electrode is in contact with the head of metal post 15. Metal post 15 extends through, and is freely floating within, plastic spacer 14. Metal washer 17 rests on plastic spacer 14. The assembly is retained within enclosure 11 by peening upper end 20 of enclosure 11 to keep metal washer 17 in place. In operation, protruding end 21 of metal post 15 is in contact with a line terminal in a station protector and grounds a voltage surge when BVSS 6 breaks down. If surge current persists sufficiently to melt solder disc 12, an external spring means in the station protector pushes metal post 15 into enclosure 11 and at the same time permanently grounds the line terminal of the station protector, thereby necessitating replacement of the surge protector to make the telephone line operative again.

We claim:

1. A surge arrester for telephone lines comprising: a threaded metal enclosure for insertion into a threaded well of a station protector; disposed within the threaded metal enclosure a solder disc, a metal plate, a BVSS, a metal post and a plastic spacer having a slotted enclosure; the solder disc being in electrical contact with the threaded metal enclosure: the metal plate being in physical contact with the solder disc; the BVSS is contained within the slotted enclosure of the plastic spacer and has two parallel flat electrodes, one of the electrodes being in physical contact with the metal plate, the other electrode being in physical contact with the metal post; and the metal post being disposed in, and extending through, the plastic spacer.

2. The surge arrester of claim 1 wherein the metal post is freely floating within the plastic spacer.

3. The surge arrester of claim 1 wherein the metal plate is made of brass or copper.

4. The surge arrester of claim 1 wherein the solder disc, the metal plate, the BVSS, the metal post and the plastic spacer are contained within a metal cage disposed in the threaded metal enclosure.

5. The surge arrester of claim arrester of claim 4 wherein the threaded metal enclosure has an open end and a closed end and wherein a coiled spring is disposed between said closed end and the cage.

6. The surge arrester of claim 1 wherein the threaded metal enclosure has an open end and a closed end and wherein the assembly of the solder disc, metal plate, BVSS, metal post and plastic spacer is held within the threaded metal enclosure by means of the open end of the threaded metal enclosure being penned against a washer bearing against the plastic spacer.

* * * * *